(12) United States Patent
Kondo et al.

(10) Patent No.: US 7,422,332 B2
(45) Date of Patent: Sep. 9, 2008

(54) WALL STRUCTURE

(75) Inventors: Tetsujiro Kondo, Tokyo (JP); Tetsushi Kokubo, Kanagawa (JP); Yasushi Tatehira, Kanagawa (JP); Kenji Tanaka, Tokyo (JP); Hitoshi Mukai, Kanagawa (JP); Hirofumi Hibi, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 11/127,829

(22) Filed: May 12, 2005

(65) Prior Publication Data

US 2005/0264768 A1  Dec. 1, 2005

(30) Foreign Application Priority Data

May 14, 2004  (JP) .............................. 2004-145034

(51) Int. Cl.
- G03B 21/22 (2006.01)
- G03B 21/28 (2006.01)
- G03B 21/14 (2006.01)
- E04H 3/10 (2006.01)
- A63G 31/16 (2006.01)

(52) U.S. Cl. .............................. 353/78; 353/79; 353/94; 353/119; 52/6; 472/60; 472/61

(58) Field of Classification Search .................... 353/74, 353/76, 94, 99, 119, 122, 10, 15, 19, 28, 353/77–79, 121; 359/449; 348/36; 352/69, 352/40, 88, 89; 52/36.1, 6, 7; 372/43.01, 372/99, 22.5, 11, 22; 472/60, 61
See application file for complete search history.

(56) References Cited

U.S. PATENT DOCUMENTS

| | | | | |
|---|---|---|---|---|
| 4,962,420 A * | 10/1990 | Judenich | ...................... | 348/744 |
| 5,255,028 A * | 10/1993 | Biles | .............................. | 353/7 |
| 6,028,701 A * | 2/2000 | Gulick et al. | ............... | 359/443 |
| 6,367,934 B1* | 4/2002 | Salesky et al. | ................ | 353/74 |
| 6,407,798 B2* | 6/2002 | Graves et al. | ................. | 352/69 |
| 6,554,433 B1* | 4/2003 | Holler | ......................... | 353/79 |
| 6,594,078 B2* | 7/2003 | Clifton et al. | ............... | 359/449 |
| 6,665,985 B1* | 12/2003 | Hennes | ........................... | 52/7 |
| 7,097,307 B2* | 8/2006 | Lawrence | ..................... | 353/28 |
| 7,118,228 B2* | 10/2006 | May | ............................ | 353/99 |
| 2005/0248735 A1* | 11/2005 | Choi | ........................... | 353/94 |

\* cited by examiner

*Primary Examiner*—Melissa Jan Koval
(74) *Attorney, Agent, or Firm*—Frommer Lawrence & Haug LLP; William S. Frommer; Ellen Marcie Emas

(57) ABSTRACT

A wall structure has a first wall and a second wall that faces the first wall. A part of the second wall or the entire second wall is configured as a rear-projection screen. A projector for projecting an image onto the rear-projection screen is arranged between the first and second walls.

19 Claims, 8 Drawing Sheets

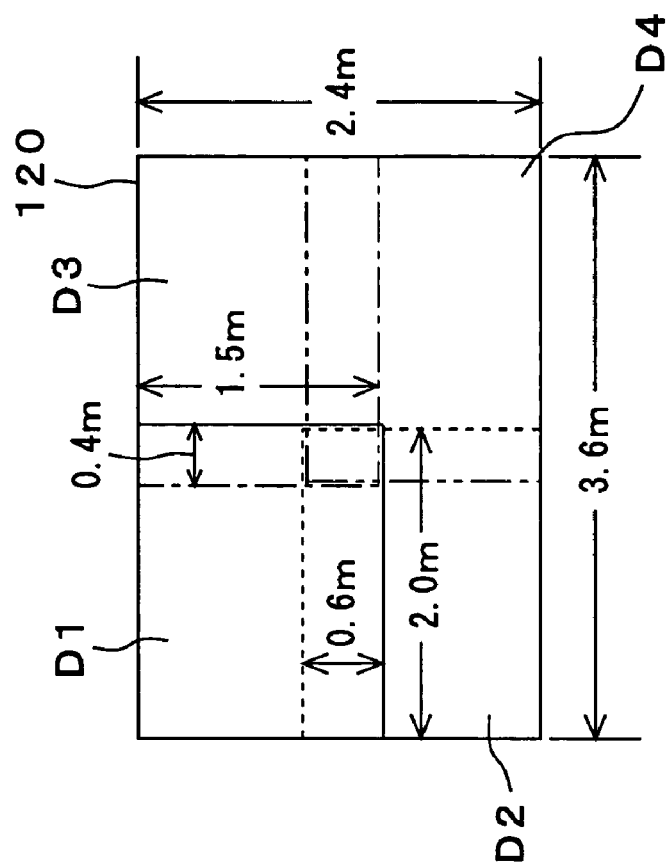
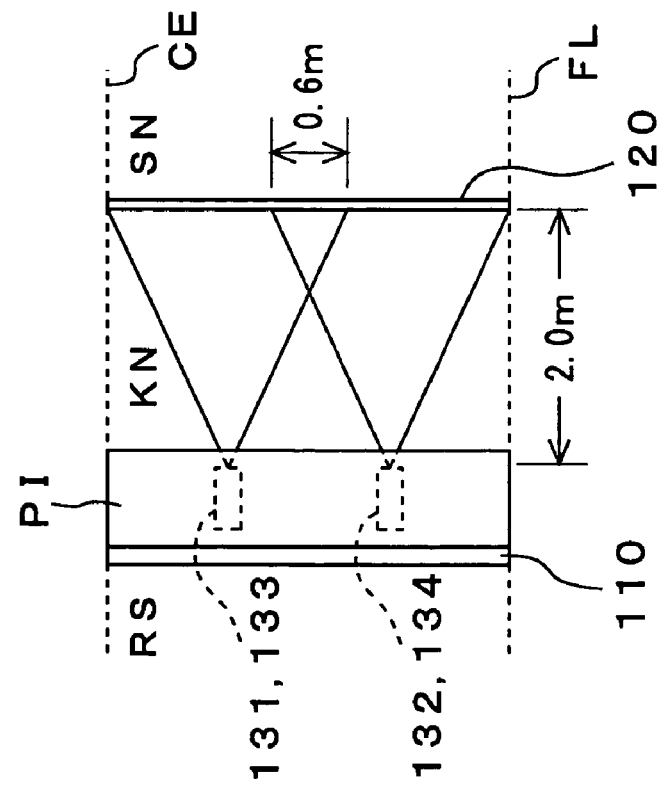

PRM

PHM

SCM

F I G. 6
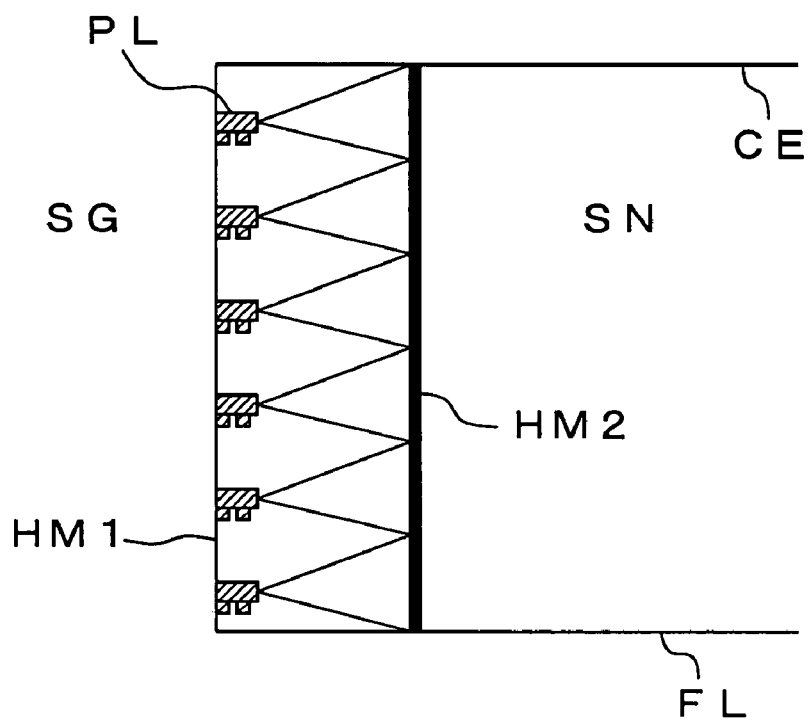
F I G. 7
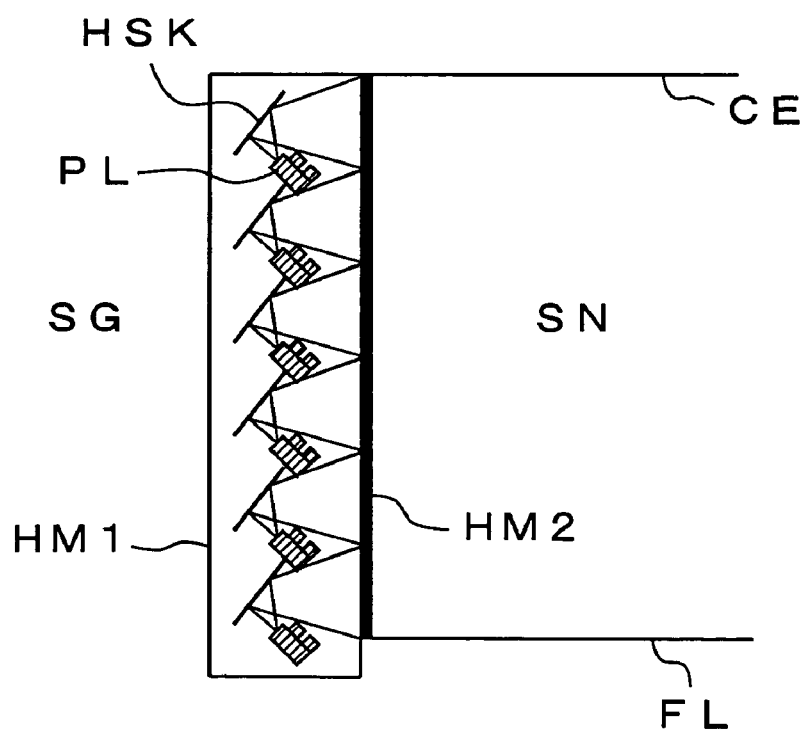

WALL STRUCTURE

CROSSREFERENCE TO RELATED APPLICATION

The present invention contains subject matter related to Japanese Patent Application No. JP 2004-145034 filed in the Japanese Patent Office on May 14, 2004, the entire contents of which being incorporated herein by reference.

BACKGROUND OF THE INVENTION

1. Field of the Invention

The present invention relates to a wall structure that could well be applied to, for example, a house, a schoolroom, a company's training room, etc.

2. Description of Related Art

Conventionally such an image display device has been known that projects an image onto a rear-projection screen using a projector. For example, Japanese Patent Application Publication No. Hei 5-161151 discloses a liquid crystal rear-projection TV as such the image display device.

The liquid crystal rear-projection TV disclosed in Japanese Patent Application Publication No. Hei 5-161151 is made thinner by reflecting projection light from a projector by using a reflecting mirror and then making the projection light incident upon a screen.

However, such the liquid crystal rear-projection TV is placed in a room and used there, so that even if the TV itself is made thinner as described above, a substantial floor area of the room is reduced. Further, the room is still made untidy by wiring lines etc.

It is desirable to enable an image to be displayed using a projector to avoid reducing a substantial floor area in a room and also making the room untidy by wiring lines etc.

SUMMARY OF THE INVENTION

According to an embodiment of the present invention, there is provided a wall structure has a first wall, and a second wall that faces the first wall. A part of the second wall or the entire second wall is configured as a rear-projection screen. The wall structure also has a projector for projecting an image onto the rear-projection screen. The projector is arranged between the first and second walls.

In the embodiment of the present invention, the second wall that faces a first wall is configured partially or totally as the rear-projection screen. If the second wall is configured as the rear-projection screen partially, for example, a central portion of this second wall is configured as the rear-projection screen. The projector is arranged between the first and second walls. This projector is used to project an image onto the rear-projection screen.

Thus, the image is displayed on the second wall configured partially or totally by the rear-projection screen without arranging a projector, the screen, etc. in a room. This enables image display by use of the projector to be implemented without reducing a substantial floor area in the room and making the room untidy.

For example, a plurality of projectors may be arranged between the first and second walls. In this case, each of the projectors may project an image onto only small region of the rear-projection screen that is assigned to them, respectively. It is thus possible to shorten an optical path length from each of the projectors to the screen, thereby reducing a distance between the first and second walls hence a wall structure thickness.

Further, for example, the projector is fixed to a building construction member such as a pillar, a beam, a brace, etc. that is present between the first and second walls. In this case, to fix the projector, the building construction member is utilized actively instead of being cleared away, so that the projector can be fixed without degrading strength of the building such as a house.

Further, for example, a reflecting mirror is further arranged between the first and second walls which reflects projection light from a projector in such a manner that the projection light may impinge on a rear-projection screen. In this case, the reflecting mirror folds an optical path length from the projector, thereby enabling to be further reduced a distance between the first and second walls hence a wall structure thickness. This reflecting mirror is also fixed to a building construction member that is present between the first and second walls. It is thus possible to fix the reflecting mirror without degrading strength of the building such as a house.

Further, for example, a maintenance port for use in maintenance of a projector is formed at a location of the first wall that corresponds to a position at which the projector is arranged. It is thus possible to easily conduct maintenance work through this maintenance port if, for example, the projector gets out of order.

Further, for example, rear-projection screens, projectors, and reflecting mirrors are respectively modularized for each type or for each combination of a plurality of types. In this case, only by fitting each module into the wall (first wall), it is possible to obtain a wall structure that enables an image to be displayed on the second wall using the projector.

According to another embodiment of the present invention, there is provided a wall structure having a first wall, and a second wall that faces the first wall. A part of the second wall or the entire second wall is configured as a rear-projection screen. The wall structure also has a reflecting mirror for reflecting projection light to make the reflected projection light incident on the rear-projection screen. The mirror is arranged between the first and second walls.

In the embodiment of the present invention, the second wall that faces the first wall is configured partially or totally as the rear-projection screen. If the second wall is configured as the rear-projection screen partially, for example, a central portion of this second wall is configured as the rear-projection screen. The reflecting mirror is arranged between the first and second walls which reflects projection light projected from the projector in such a manner that the projection light may impinge on the rear-projection screen.

Thus, the image is displayed on the second wall configured partially or totally as the rear-projection screen without arranging a projector, the screen, etc. in a room. This enables image display by use of the reflecting mirror to be implemented without reducing a substantial floor area in the room and making the room untidy. The reflecting mirror folds an optical path length from the projector, thereby enabling a distance between the first and second walls hence a wall structure thickness to be reduced.

For example, a plurality of reflecting mirrors may be arranged between the first and second walls. In this case, each of the reflecting mirrors may make the projection light projected from the projector incident on only small region of the rear-projection screen that is assigned to them, respectively. It is thus possible to shorten an optical path length from each of the reflecting mirrors to the screen, thereby reducing a distance between the first and second walls hence a wall structure thickness.

Further, for example, the reflecting mirror is fixed to a building construction member such as a pillar, a beam, a brace, etc. that is present between the first and second walls. In this case, to fix the mirror, the building construction member is utilized actively instead of being cleared away, so that the mirror can be fixed without degrading strength of the building such as a house.

Further, for example, a projector may be arranged between the first and second walls. This projector is also fixed to the building construction member present between, for example, the first and second walls. It is thus possible to fix the projector without degrading strength of the building such as a house. In this case, a maintenance port for use in maintenance of this projector is formed at a location of the first wall that corresponds to a position at which the projector is arranged. It is thus possible to easily conduct maintenance work through this maintenance port if, for example, the projector gets out of order.

Further, for example, the projector may not be arranged between the first and second walls but arranged, for example, at a ceiling or under a floor. In a case where the projector is arranged at the ceiling, under the floor, etc., a maintenance port for use in maintenance of the projector can be formed in this ceiling, floor, etc. It is thus possible to easily conduct maintenance work through this maintenance port if, for example, the projector gets out of order.

Further, for example, rear-projection screens, projectors, and reflecting mirrors are respectively modularized for each type or for each combination of a plurality of types. In this case, only by fitting each module into the wall (first wall), it is possible to obtain a wall structure that enables an image to be displayed on the second wall using the projector.

According to the above embodiments of the present invention, a wall structure having a first wall and a second wall that face each other is provided. In the wall structure, the second wall is configured partially or totally as a rear-projection screen and a projector for projecting an image onto this screen or a reflecting mirror for reflecting projection light projected from the projector in such a manner that the projection light may impinge on this screen is arranged between the first and second walls, thereby enabling an image to be displayed by using the projector without reducing a substantial floor area of a room and making the room untidy by wiring lines etc.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 3A is a diagram for illustrating a photographing range of each projector;

FIG. 3B is a diagram for illustrating a photographing range of each projector;

FIG. 6 is a diagram for illustrating a projecting operation of the projectors according to an embodiment of the present invention;

FIG. 7 is a diagram for illustrating a projecting operation of the projectors by use of reflecting mirrors according to another embodiment of the present invention;

DESCRIPTION OF THE PREFERRED EMBODIMENTS

Figure 1:
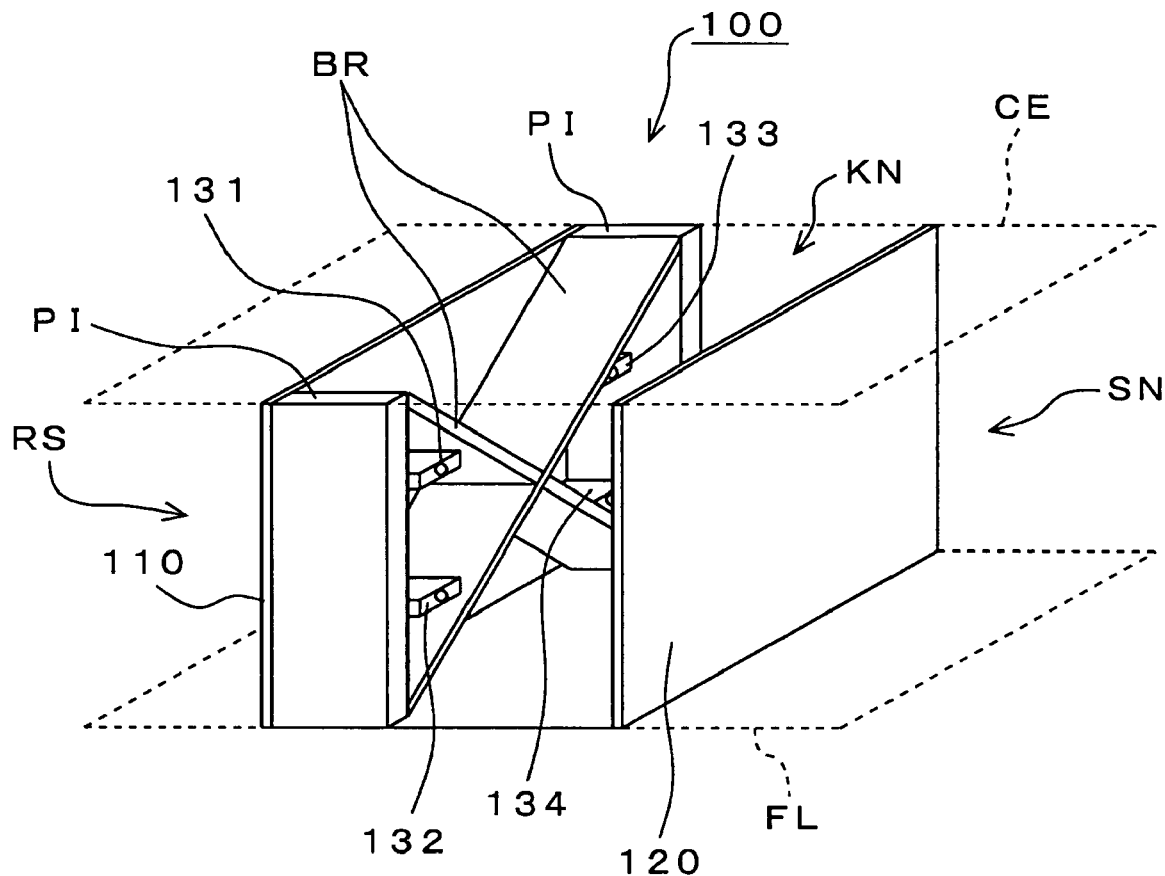
FIG. 1 is a perspective view for showing a configuration of a first embodiment of a wall structure according to the invention.

The following will describe embodiments of a wall structure in accordance with accompanying drawings. FIG. 1 shows a configuration of a first embodiment of the wall structure 100 according to the invention.

This wall structure 100 has a first wall 110 and a second wall 120 that are provided as erected between a ceiling surface CE and a floor surface FL in a condition where they face each other. The first wall 110 is also a wall of a next room RS and configured by a typical building material such as a gypsum board. The second wall 120 is a wall in an inside-of-room SN and totally configured as a rear-projection screen. This rear-projection screen is produced by applying a light diffusion sheet on, for example, an acrylic board or a glass plate.

In an inside-of-wall-structure KN between the first and second walls 110 and 120, a predetermined number of projectors, in the present embodiment, four projectors 131-134, are arranged. Those projectors 131-134 are used to project an image onto the second wall 120 configured as a rear-projection screen. In this case, each of the projectors 131-134 projects the image onto small region on the second wall 120 that is assigned to them, respectively. With this, one synthesized image is displayed on the entire second wall 120.

Figure 2:
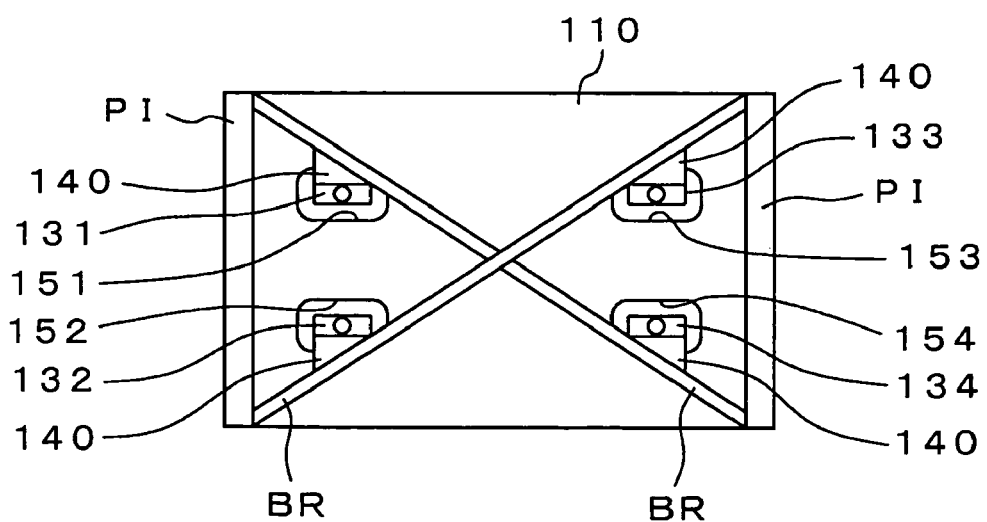
FIG. 2 is a plan view for showing an inside-of-wall-structure.

This inside-of-wall-structure KN between the first and second walls 110 and 120 is provided therein with a house building construction members, a pillar PI and a brace BR. As shown in FIG. 2, the projectors 131-134 are each fixed to the brace BR that constitutes this house building construction members via an auxiliary fixture member 140 having a right-angle-triangular cross-section. By this auxiliary fixture member 140, the projector 131-134 can each fixed to the inclined brace BR in a condition where they are each held horizontally.

The inside-of-wall-structure KN between the first and second walls 110 and 120 is painted with black delusterant except the second wall configured as the rear-projection screen.

Further, maintenance ports 151-154 for use in maintenance of these projectors 131-134 are formed at locations on the first wall 110 that correspond to positions where the projectors 131-134 are arranged respectively, as shown in FIG. 2. Those maintenance ports 141-154 are covered by a cap, which is not shown, except in maintenance.

As described above, each of the projectors 131-134 projects an image onto the small region on the second wall 120 that is assigned to them, respectively. In this case, projection ranges of the projectors 131-134 are adapted to overlap each other to some extent. For example, if a height of the second wall 120 hence the rear-projection screen is 2.4 m and its width is 3.6 m (which are tantamount to a longitudinal direction of six tatami-mats) as shown in FIGS. 3A and 3B, a projector's projection area is set to 2.0 m×1.5 m and a projector's projection distance is set to 2.0 m.

In FIG. 3B, a left top corner rectangular region D1 indicates the projection range of the projector 131, a left bottom corner rectangular region D2 indicates the projection range of the projector 132, a right top corner rectangular region D3 indicates the projection range of the projector 133, and a right bottom corner rectangular region D4 indicates the projection range of the projector 134. In this case, the projection ranges overlap each other by 0.6 m vertically and 0.4 m horizontally.

In such a manner, in the wall structure 100 shown in FIGS. 1 and 2, an image is displayed on the second wall 120 configured as the rear-projection screen. The projectors, the screens, etc. are arranged out of the inside-of-room SN, so that it is possible to display an image using the projectors without reducing a substantial floor area of the inside-of-room SN and making it untidy by wiring lines etc.

Further, in the wall structure 100 shown in FIGS. 1 and 2, the four projectors 131-134 are arranged between the first and second walls 110 and 120, so that each of these projectors may project an image onto only the small region assigned to each projector on the second wall (rear-projection screen) 120. This allows to be shortened an optical path length from each of the projectors to the screen, thereby reducing a distance between the first and second walls 110 and 120 hence a wall structure thickness.

Further, in the wall structure 100 shown in FIGS. 1 and 2, the projectors 131-134 are each fixed to the brace BR used as a building construction member that is positioned between the first and second walls 110 and 120. To fix the projectors 131-134, the building construction member is actively used instead of being cleared away, so that the projectors 131-134 can be fixed without degrading strength of the building such as a house.

Further, in the wall structure 100 shown in FIGS. 1 and 2, the maintenance ports 151-154 for use in maintenance of these projectors 131-134 are formed at the locations on the first wall 110 that correspond to the positions where the projectors 131-134 are arranged respectively. It is thus possible to easily conduct maintenance work through these maintenance ports 151-154 from the next room if the projectors 131-134 get out of order, respectively.

Although the second wall 120 has been entirely configured as the rear-projection screen in the wall structure 100 shown in FIGS. 1 and 2, this second wall 120 may be configured only partially as the rear-projection screen. In this case, for example, a central portion of the second wall 120 is configured as the rear-projection screen and its peripheral portions are configured by a gypsum board etc.

Further, although the four projectors 131-134 have been arranged in the inside-of-wall-structure KN between the first and second walls 110 and 120 in the wall structure 100 shown in FIGS. 1 and 2, the number of the projectors arranged in the inside-of-wall-structure KN is not limited to this but may be any other plural value or one.

Further, although the present invention has been applied to a house wall structure in the case of the wall structure 100 shown in FIGS. 1 and 2, the present invention can be applied similarly to the wall structure of a schoolroom, a company's training room, or the like.

Figure 4:
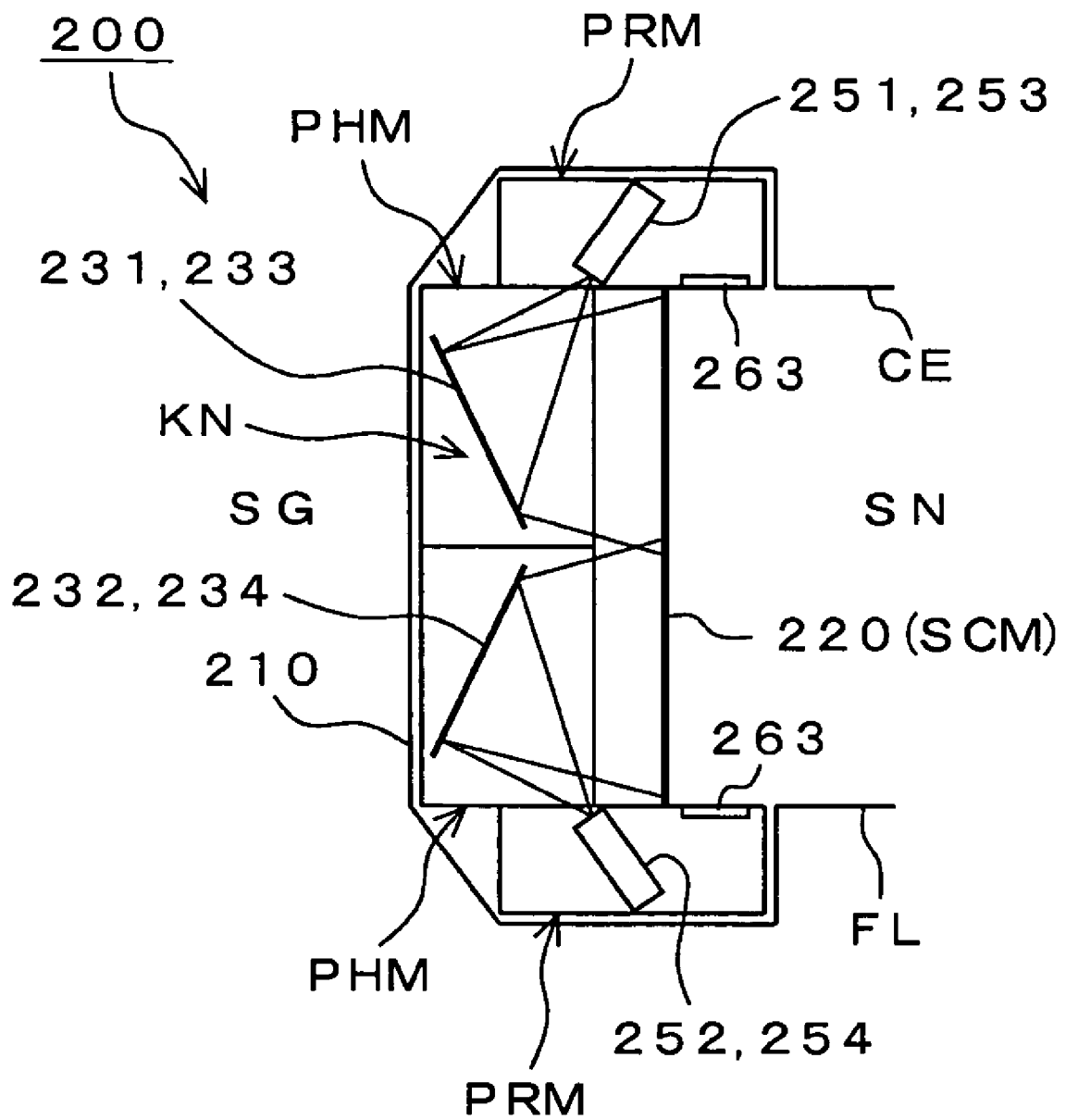
FIG. 4 is a side view for showing a configuration of a second embodiment of a wall structure according to the invention.

The following will describe a second embodiment of a wall structure 200 according to the present invention. FIG. 4 shows a configuration of the second embodiment of the wall structure 200.

Figure 5A:
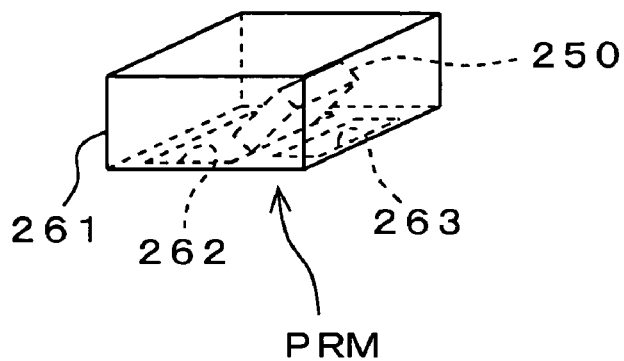
FIG. 5A is a perspective view for showing a projector module.

This wall structure 200 has a first wall 210 and a second wall 220 that are provided as erected between a ceiling surface CE and a floor surface FL in a condition where they face each other. The first wall 210 is also a wall of an outside-of-room SG and configured by a typical building material such as a gypsum board. The second wall 220 is a wall in an inside-of-room SN and configured as a rear-projection screen. This second wall 220 is formed by fitting one such screen module SCM as shown in FIG. 5C prepared beforehand. This screen module SCM is produced by applying a light diffusion sheet on, for example, an acrylic board or a glass plate.

Further, in an inside-of-wall-structure KN between the first and second walls 210 and 220, a predetermined number of reflecting mirrors, in the present embodiment, four reflecting mirrors 231-234, are arranged. Those reflecting mirrors 231-234 are arranged in a 2-by-2 matrix. Each of the reflecting mirrors 231-234 reflects projection light projected from a projector in such a manner that the light may impinge on the second wall 220 configured as the rear-projection screen. In this case, the reflecting mirrors 231-234 make the reflected projection light incident on small regions on the second wall 220 that are assigned to them, respectively. With this, one synthesized image is displayed on the entire second wall 220.

Figure 5B:
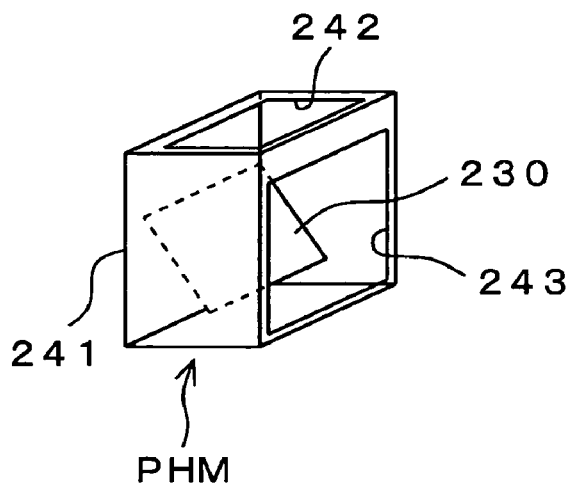
FIG. 5B is a perspective view for showing an optical system module.
Figure 5C:
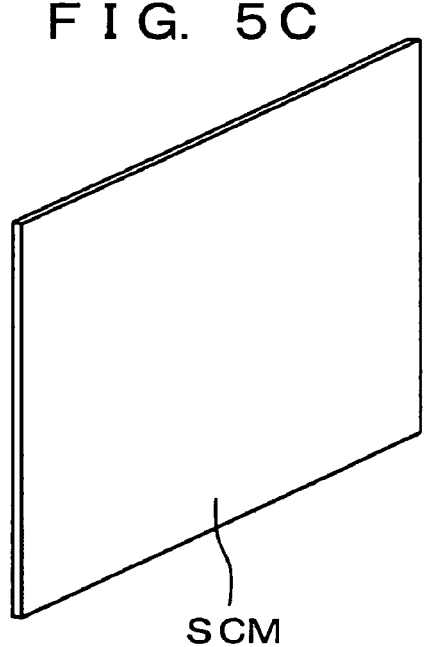
FIG. 5C is a perspective view for showing a screen module.

Those reflecting mirrors 231-234 are arranged in the inside-of-wall-structure KN between the first and second walls 210 and 220 by fitting four such optical system modules PHM as shown in FIG. 5B prepared beforehand between the first and second walls 210 and 220. It is to be noted that the optical system module PHM includes a cuboid-shaped frame 241 in which a reflecting mirror 230 is placed. The frame 241 has a first opening 242 for passing therethrough projection light from the projector and a second opening 243 for passing therethrough the projection light reflected by the reflecting mirror 230.

Projectors 251-254 for supplying projection light to the reflecting mirrors 231-234 respectively are arranged out of a space, the inside-of-wall-structure KN, between the first and second walls 210 and 220. The projectors 251 and 253 are arranged in the ceiling by fitting two such projector modules PRM as shown in FIG. 5A prepared beforehand into the ceiling, respectively. The projectors 252 and 254, on the other hand, are arranged under the floor by fitting two such projector modules PRM as shown in FIG. 5A prepared beforehand into a floor bottom. It is to be noted that the projector module PRM includes a cuboid-shaped frame 261 in which a projector 250 is placed. The frame 261 has an opening 262 for passing therethrough projection light from the projector and an opening 263 for use in maintenance of the projector 250. This maintenance port 263 is covered by a cap, which is not shown, except in maintenance.

As described above, the reflecting mirrors 231-234 reflect the projection light projected from the projectors 251-254 to make the reflected projection light incident on the small regions on the second wall 220 that are assigned to them, respectively. In this case, projection ranges of the projectors 251-254 are adapted to overlap each other to some extent (see FIG. 3B).

In such a manner, in the wall structure 200 shown in FIG. 4, an image is displayed on the second wall 220 configured as the rear-projection screen. The projectors, the screens, etc. are arranged out of the inside-of-room SN, so that it is possible to display an image using the projectors without reducing a substantial floor area of the inside-of-room and making it untidy by wiring lines etc.

Further, in the wall structure 200 shown in FIG. 4, an optical path length from each of the projectors 251-254 is folded by each of the reflecting mirrors 231-234, thereby enabling reducing a distance between the first and second walls 210 and 220 hence a wall structure thickness.

Further, in the wall structure 200 shown in FIG. 4, a plurality of reflecting mirrors 231-234 is arranged between the first and second walls 210 and 220 and each of these reflecting mirrors may cause the projection light from the projector to be made incident on its assigned small region on the rear-projection screen, thereby shortening an optical path length from each of the reflecting mirrors to the screen and reducing the distance between the first and second walls 210 and 220 hence the wall structure thickness.

Further, the wall structure 200 shown in FIG. 4 can be formed easily only by fitting the rear-projection screen SCM that has modulated the rear-projection screens and the optical system module PHM that has modulated the reflecting mirrors 230, into the wall (first wall).

Further, in the wall structure 200 shown in FIG. 4, the maintenance port 263 is formed in the frame 261 of the projector module PRM, so that it is possible to easily conduct maintenance work through the maintenance port 263 in the ceiling or the floor in the room if the projectors 251-254 get out of order.

Although the second wall 220 is entirely configured as the rear-projection screen in the wall structure 200 shown in FIG. 4, this second wall 220 may be configured only partially as the rear-projection screen. In this case, for example, a central portion of the second wall 220 is configured as the rear-projection screen and its peripheral portions are configured by a gypsum board etc.

Further, although the four reflecting mirrors 231-234 have been arranged in the inside-of-wall-structure KN between the first and second walls 210 and 220 in the wall structure 200 shown in FIG. 4, the number of the reflecting mirrors arranged in the inside-of-wall-structure KN is not limited to this but may be any other plural value or one.

Further, although the present invention has been applied to a house wall structure in the case of the wall structure 200 shown in FIG. 4, the present invention can be applied similarly to the wall of a schoolroom, a company's training room, etc.

Further, in the wall structure 200 shown in FIG. 4, the reflecting mirrors 231-234 are arranged in the inside-of-wall-structure KN between the first and second walls 210 and 220 by fitting the optical system module PHM into the inside-of-wall-structure KN.

However, the reflecting mirrors 231-234, which are not modularized, may be arranged in the inside-of-wall-structure KN by fixing the reflecting mirrors 231-234 themselves to a building construction member such as a pillar PI or a brace BR as in the case of the projectors 131-134 in the wall structure 100 shown in FIGS. 1 and 2. In this case, to fix the reflecting mirrors 231-234, the building construction member is utilized actively instead of being cleared away, so that it is possible to fix the reflecting mirrors 231-234 without degrading strength of the building such as a house.

Further, although the projectors 251-254 have been arranged out of a space, the inside-of-wall-structure KN, between the first and second walls 210 and 220, these projectors 251-254 may be considered to be arranged in the space, the inside-of-wall-structure KN, between the first and second walls 210 and 220 as in the case of the reflecting mirrors 231-234.

In this case, these projectors 251-254 can also be fixed, for example, to a building construction member that is present between the first and second walls 210 and 220. This enables to be fixed the projectors 251-254 without degrading the strength of the building such as a house.

Further, in this case, maintenance ports for use in maintenance of these projectors 251-254 can be formed at locations on the first wall 210 that correspond to positions where the projectors 251-254 are arranged, respectively. It is thus possible to conduct maintenance work easily through the maintenance ports if the projectors 251-254 get out of order.

Further, although the same type of components, that is, the rear-projection screens, the reflecting mirrors, and the projectors has been modularized respectively as in the cases of the screen module SCM, the optical system module PHM, the projector module PRM, etc. in the wall structure 200 shown in FIG. 4, they may be considered to be modularized for each combination of a plurality of types. For example, components of the reflecting mirrors and the projectors may be combined into a module.

Although not described above, in the wall structure 100 shown in FIGS. 1 and 2 also, the components of the rear-projection screens and those of the projectors can be put into one module to fit each of these modules into the first wall 110, thereby forming this wall 110.

The following will describe main points relative to the above embodiments of the present invention.

(Point 1) According to an embodiment of the present invention, as shown in FIG. 6, provided is a wall structure having a first wall HM1 and a second wall HM2 that face each other. The second wall HM2 is partially or totally configured as a rear-projection screen and a projector PL (projectors in a case shown in FIG. 6) is arranged between the first and second walls HM1 and HM2. In the embodiment of the present invention, the projector(s), the screen, etc. are arranged out of an inside-of-room SN, thereby enabling an image to be displayed using the projector without reducing a substantial floor area of the inside-of-room SN and making the inside-of-room SN untidy by wiring lines etc.

(Point 2) According to another embodiment of the present invention, as shown in FIG. 7, provided is another wall structure having a first wall HM1 and a second wall HM2 that face each other. The second wall HM2 is partially or totally configured as a rear-projection screen. A reflecting mirror (mirrors in a case shown in FIG. 6) HSK for reflecting projection light projected from a projector PL to make the reflected light incident on the rear-projection screen is arranged between the first and second walls HM1 and HM2. In the embodiment of the present invention, the reflecting mirror(s), the screen, etc. are arranged out of an inside-of-room SN, thereby enabling an image to be displayed using the projector without reducing a substantial floor area of the inside-of-room SN and making the inside-of-room SN untidy by wiring lines etc. It is to be noted that FIG. 7 shows an example where the projector(s) are also arranged between the first and second walls HM1 and HM2.

Figure 8:
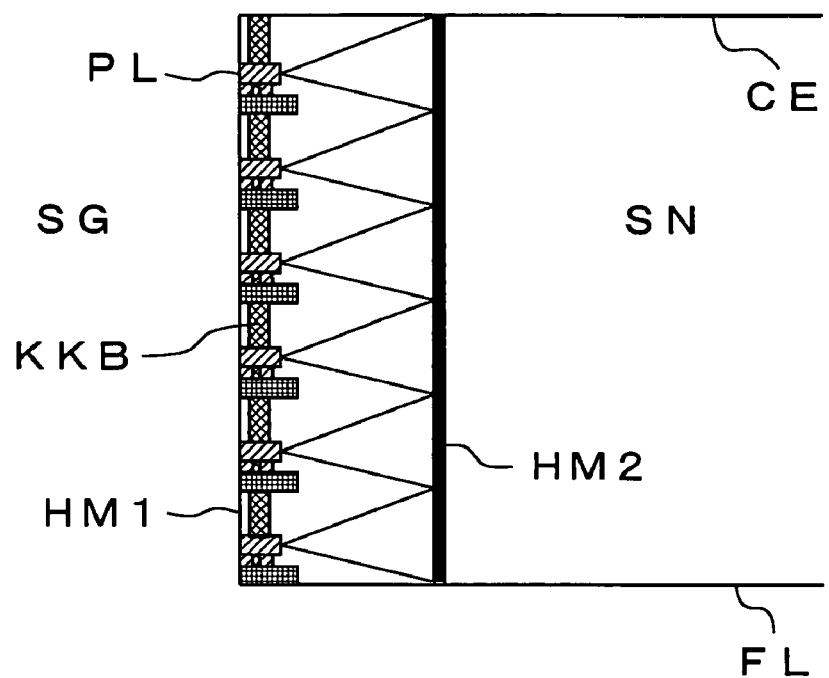
FIG. 8 is a diagram for illustrating a projecting operation of the projectors according to further embodiment of the present invention.

(Point 3) According to further embodiment of the present invention, as shown in FIG. 8, provided is further wall structure in which projectors PL that are arranged between a first wall HM1 and a second wall HM2 are fixed to a building construction member KKB such as a pillar, a beam, and a brace. In the embodiment of the present invention, to fix the projectors, the building construction member KKB is utilized actively instead of being cleared away, thereby fixing the projectors without degrading strength of the building such as a house.

Figure 9:
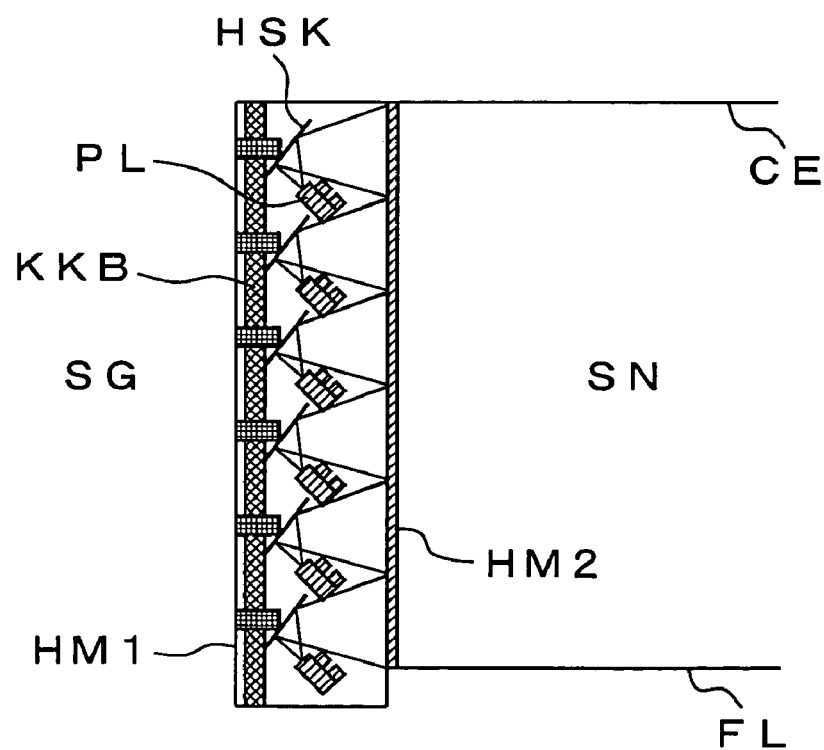
FIG. 9 is a diagram for illustrating a projecting operation of the projectors by use of reflecting mirrors according to still another embodiment of the present invention.

(Point 4) According to still another embodiment of the present invention, as shown in FIG. 9, provided is still another wall structure in which reflecting mirrors HSK that are arranged between a first wall HM1 and a second wall HM2 are fixed to a building construction member KKB such as a pillar, a beam, and a brace. In the embodiment of the present invention, to fix the reflecting mirrors HSK, the building construction member KKB is utilized actively instead of being cleared away, thereby fixing the reflecting mirrors HSK without degrading strength of the building such as a house.

Figure 10:
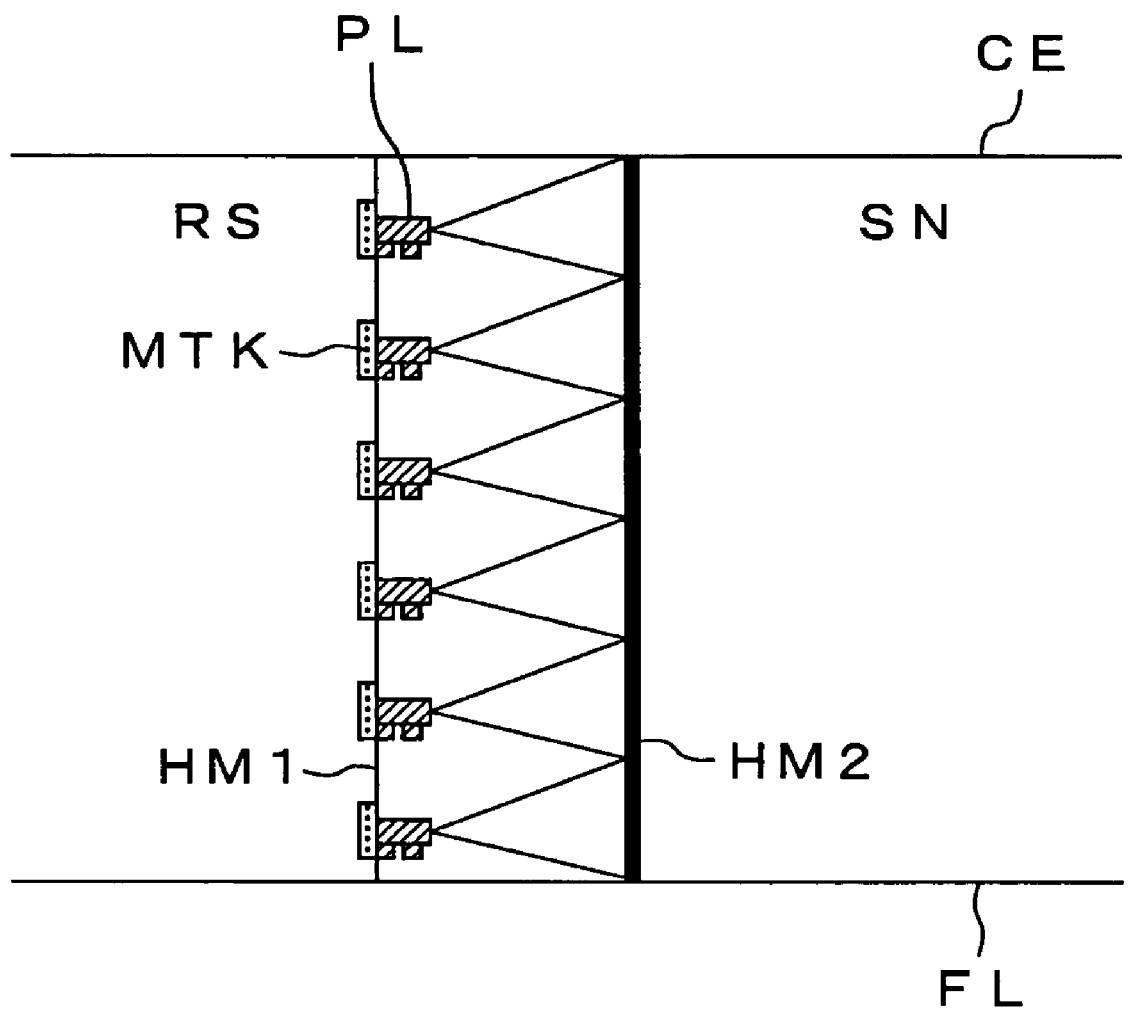
FIG. 10 is a diagram for illustrating a projecting operation of the projectors according to still further embodiment of the present invention.

(Point 5) According to still further embodiment of the present invention, as shown in FIG. 10, provided is still further wall structure in which maintenance ports MTK each for use in maintenance of a projector is formed at a location on the first wall HM1 that corresponds to a position at which this projector is arranged. According to the embodiment of the present invention, it is possible to conduct maintenance work through the corresponding maintenance port MTK from the next room etc. if the projector gets out of order.

(Point 6) According to additional embodiment of the present invention, as shown in FIGS. 6 through 10, provided is additional wall structure in which a plurality of projectors PL is arranged between a first wall HM1 and a second wall HM2. In the embodiment of the present invention, each of the projectors may project an image onto its assigned small region of a rear-projection screen, thereby shortening an optical path length from the corresponding projector to the screen and reducing a distance between the first and second walls HM1 and HM2 hence a wall structure thickness.

(Point 7) According to still additional embodiment of the present invention, as shown in FIGS. 7 and 9, provided is still additional wall structure in which a plurality of reflecting mirrors HSK is arranged between a first wall HM1 and a second wall HM2. In the embodiment of the present invention, each of the reflecting mirrors may reflect light projected from a projector to make the reflected light incident on its assigned small region of a rear-projection screen, thereby shortening an optical path length from the corresponding reflecting mirror to the screen and reducing a distance between the first and second walls HM1 and HM2 hence a wall structure thickness.

Figure 11B:
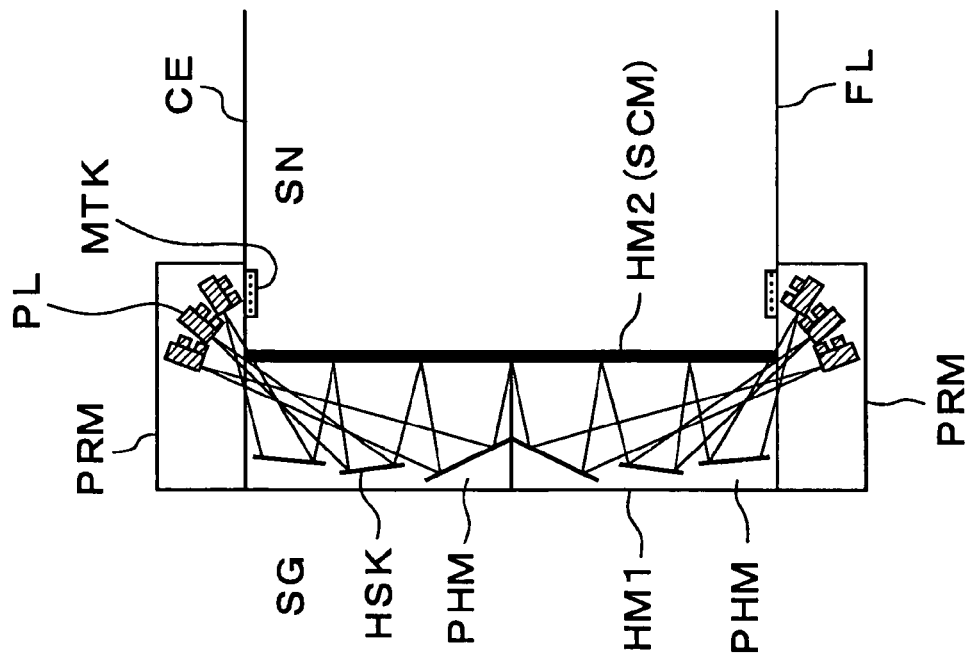
FIG. 11B is a diagram for illustrating a projecting operation of the modularized projectors and reflecting mirrors according to additional embodiment of the present invention.
Figure 11A:
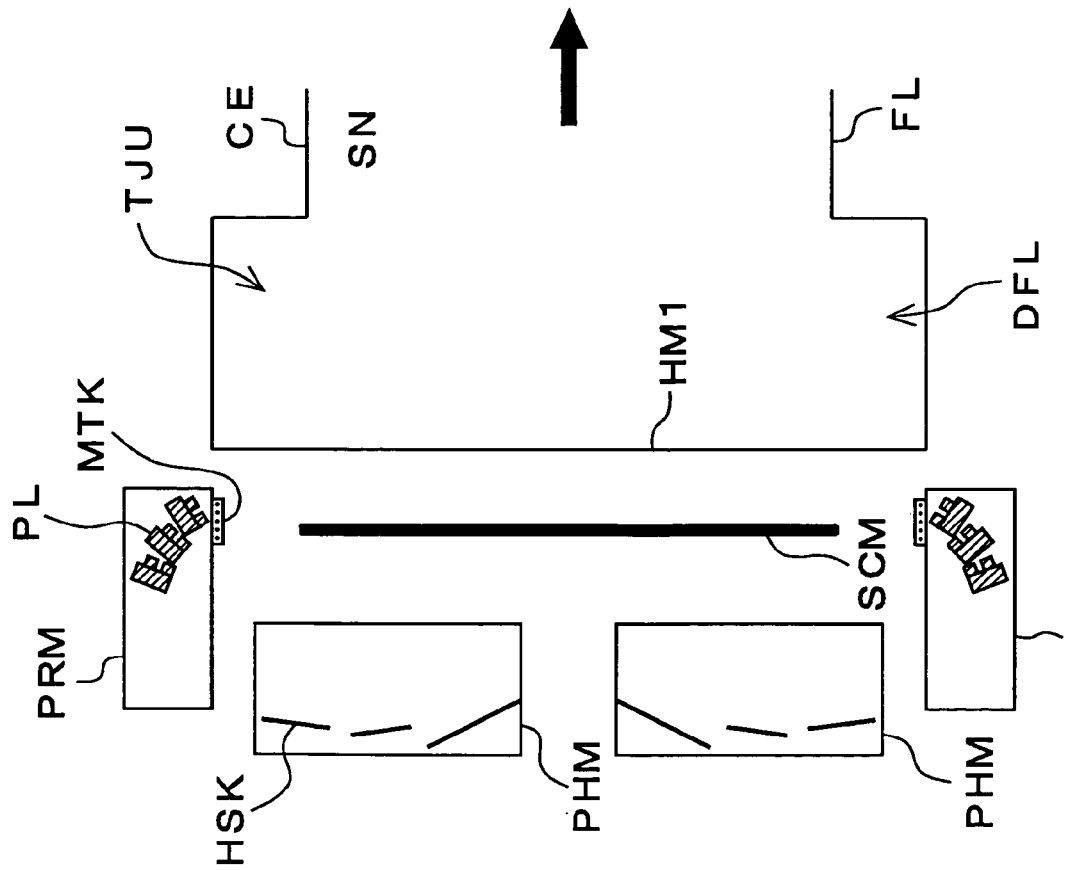
FIG. 11A is a diagram for illustrating the modularized projectors and reflecting mirrors according to additional embodiment of the present invention.

(Point 8) According to another embodiment of the present invention, as shown in FIG. 11A, provided is another wall structure in which rear-projection screens, reflecting mirrors HSK, and projectors PL are modularized for each type or for each combination of a plurality of types. FIG. 11B shows a layout in which these modules are arranged in place. In the embodiment of the present invention, it is possible to obtain the wall structure that can display an image on a second wall HM2 using the projectors PL only by fitting each module into a wall (first wall HM1). It is to be noted that FIG. 11B shows an example where the reflecting mirrors HSK are arranged between the first wall HM1 and the second wall HM2 and the projectors PL are arranged out of a space between the first and second walls HM1 and HM2 (in the ceiling "TJU" or under the floor "DFL"). Further, FIGS. 11A and 11B show an example where a screen module SCM, an optical system module PHM, and a projector module PRM that are each of the same type are used.

The above embodiments of the present invention enable to be displayed an image by using a projector (or projectors) or the like without reducing a substantial floor area of a room and making the room untidy by wiring lines etc. and so can be well applied to a wall structure of, for example, a house, a schoolroom, a company's training room, etc.

Thus have been described the wall structure having a first wall, a second wall that faces the first wall, at least a part of the second wall being configured as a rear-projection screen, a projector (or projectors) for projecting an image onto the rear-projection screen, and/or the reflecting mirror (or mirrors) for the reflecting projection light from the projector to make the projection light incident on the rear-projection screen, the projector(s) and /or the mirror(s) being arranged between the first and second walls. It should be understood by those skilled in the are that various modifications, combinations, sub-combinations and alternations may occur depend on design requirements and other factors insofar as they are within the scope of the appended claims or the equivalents thereof.

What is claimed is:

1. A wall structure comprising:
   a first wall;
   a second wall having a first side which is part of a room, the second wall extending between a ceiling surface and a floor surface and a second side of the second wall faces the first wall, at least a part of said second wall being configured as a rear-projection screen; and
   a projector for projecting an image onto the rear-projection screen, said projector being arranged between the first and second walls, wherein the image is viewed on the first side of the second wall in the room.

2. The wall structure according to claim 1, wherein a plurality of the projectors is arranged between the first and second walls.

3. The wall structure according to claim 1, wherein the projector is fixed to a building construction member present between the first and second walls.

4. The wall structure according to claim 1, further comprising a reflecting mirror for reflecting light projected from the projector to make the reflected light incident on the rear-projection screen, said mirror being arranged between the first and second walls.

5. The wall structure according to claim 4, wherein the reflecting mirror is fixed to a building construction member present between the first and second walls.

6. The wall structure according to claim 1, wherein a maintenance port for use in maintenance of the projector is formed at a location on the first wall, said location corresponding to a position at which this projector is arranged.

7. The wall structure according to claim 1, wherein the rear-projection screen and the projector are modularized for any one of each same type and each combination of a plurality of types.

8. A wall structure comprising:
   a first wall;
   a second wall having a first side which is part of a room, the second wall attached between a floor surface and a ceiling surface and a second side of the second wall faces the first wall, at least a part of said second wall being configured as a rear-projection screen; and
   a reflecting mirror for reflecting projection light to make the reflected projection light incident on the rear-projection screen, said mirror being arranged between the first and second walls, wherein the reflected projection light is viewed on the first side of the second wall in the room.

9. The wall structure according to claim 8, wherein a plurality of the reflecting mirrors is arranged between the first and second walls.

10. The wall structure according to claim 8, wherein the reflecting mirror is fixed to a building construction member present between the first and second walls.

11. The wall structure according to claim 8, wherein a projector for projecting an image onto the rear-projection screen is arranged between the first and second walls.

12. The wall structure according to claim 11, wherein the projector is fixed to a building construction member present between the first and second walls.

13. The wall structure according to claim 11, wherein a maintenance port for use in maintenance of the projector is formed at a location on the first wall, said location corresponding to a position at which this projector is arranged.

14. The wall structure according to claim 8, wherein the projector is arranged outside a space between the first and second walls.

15. The wall structure according to claim 8, wherein the rear-projection screen and the reflecting mirror are modularized for any one of each type and each combination of a plurality of types.

16. A wall configuration of a structure comprising:
a first wall;
a second wall having a first side which is part of a room in the structure, the second wall connected to a floor and a ceiling and a second side of the second wall facing the first wall, at least a part of said second wall being configured as a rear-projection screen; and
a projector for projecting an image onto the rear-projection screen, said projector being arranged between the first and second walls, wherein the image is viewed on the first side of the second wall in the room.

17. The wall structure according to claim 1, further comprising a space formed between the first and second walls containing construction members for structure strength.

18. The wall structure according to claim 8, further comprising a space formed between the first and second walls containing construction members for structure strength.

19. The wall configuration according to claim 16, further comprising a space formed between the first and second walls containing construction members for structure strength.

* * * * *